United States Patent

Kaplan et al.

[11] Patent Number: 5,533,149
[45] Date of Patent: Jul. 2, 1996

[54] COMPUTER BASED DIGITAL IMAGE NOISE REDUCTION METHOD BASED ON OVERLAPPING PLANAR APPROXIMATION

[75] Inventors: Martin C. Kaplan, Rochester; Heemin Kwon, Pittsford, both of N.Y.

[73] Assignee: Eastman Kodak Company, Rochester, N.Y.

[21] Appl. No.: 781,468

[22] Filed: Oct. 23, 1991

Related U.S. Application Data

[63] Continuation of Ser. No. 399,135, Aug. 28, 1989, abandoned.

[51] Int. Cl.[6] .................................................. G06K 9/40
[52] U.S. Cl. .......................................... 382/260; 382/275
[58] Field of Search ................................ 382/27, 50, 54, 382/205, 260, 275, 254; 358/36, 167, 447, 463, 400; 364/574; 348/607

[56] References Cited

U.S. PATENT DOCUMENTS

| | | | |
|---|---|---|---|
| 4,510,618 | 4/1985 | Ataman et al. | 382/54 |
| 4,520,505 | 5/1985 | Yamamoto et al. | 382/55 |
| 4,731,865 | 3/1988 | Sivenpiper | 382/54 |
| 4,734,770 | 3/1988 | Matsuba | 358/167 |
| 4,794,531 | 12/1988 | Morishita et al. | 364/413.13 |
| 4,817,180 | 3/1989 | Cho et al. | 382/54 |
| 4,827,533 | 5/1989 | Tanaka | 382/54 |
| 4,903,316 | 2/1990 | Hongo et al. | 382/52 |
| 4,941,192 | 7/1990 | Mishima et al. | 382/54 |
| 5,091,972 | 2/1992 | Kwon et al. | 382/54 |

OTHER PUBLICATIONS

Panda et al., "Recursive Least Squares Smoothing of Noise in Images," *IEEE Trans. on Acoustics, Speech and Signal Proc.*, vol. ASSP–25, No. 6, Dec. 77, pp. 520–524.

*Primary Examiner*—Leo Boudreau
*Assistant Examiner*—Andrew W. Johns
*Attorney, Agent, or Firm*—Raymond L. Owens

[57] ABSTRACT

The method of the present invention reduces noise in digital photographic images by decomposing the digital image into smooth regions and edge regions and by electronically blurring the smooth regions. Smooth regions are areas lacking any sharp detail, such as blue sky. Edge regions are regions containing sharp detail, such as grass. The method operates by choosing a set of neighborhood pixel types from a matrix of pixels representing an image. For each target pixel in the image, all neighborhoods that include the target pixel are considered and a linear least squares regression is computed to fit a plane to the code values of the pixels in each neighborhood, resulting in a goodness of fit and a least squares estimate for the code value at the target pixel. Finally, a noise reduced code value for the target pixel is computed as a normalized, weighted sum of the least squares estimates for the target pixel, summed over all the neighborhoods containing the target pixel. The weights are determined as a function of the goodness of fit and the neighborhood type.

1 Claim, 7 Drawing Sheets

COMPUTER BASED DIGITAL IMAGE NOISE REDUCTION METHOD BASED ON OVERLAPPING PLANAR APPROXIMATION

This is a continuation of application Ser. No. 399,135, filed Aug. 28, 1989, now abandoned.

CROSS-REFERENCE TO RELATED APPLICATION

The present application is related to U.S. patent application Ser. No. 399,134 filed on even date with the present application and entitled "Digital Image Noise Reduction of Luminance and Chrominance based on Overlapping Planar Approximation" by M. Kaplan et al. The related application bears the Assignee's Docket Number 56,762.

TECHNICAL FIELD OF THE INVENTION

The present invention relates to an image data processing method and, more particularly, to a method for reducing noise in digital photographic images based on smoothing, by a blurring technique, the smooth regions of a digital image while maintaining the edge regions undisturbed.

BACKGROUND OF THE INVENTION

To transform a digital image to a finished print of high quality requires that noise components, introduced because of the transformation of the image from the original scene to electrical signals, be reduced and/or eliminated such that the noise does not become discernible to the human eye.

One of the methods receiving widespread use in the prior art is related to smoothing the differences between the values of the gray levels of pixels located in neighborhoods. A difficulty associated with this smoothing process is that it not only removes the noise components, but it also blurs the edge values. The edges exist when there is a transition region such as a region containing sharp detail, for example grass, which may define or outline a neighboring region which may be either smooth or sharply detailed.

A patent of interest for its teaching of noise reduction in a data processed image is U.S. Pat. No. 4,734,770 entitled "Image Data Processing Method and Device Therefor" by I. Matsuba. The method of that patent treats the first image data set, consisting of a plurality of pixels having values corresponding to their gray level, some of which contain noise components, by transforming them into second image data to reduce the noise components appearing in the second image data. The method operates by selecting pixels to be treated and obtaining proposed values (candidate values) which should be given to the object pixels based on a stated relationship. A probability function is used to determine whether a pixel in question should be raised to the candidate value or be maintained at its present value. The probability formula includes the image energy component as one of its terms. A recognition is made for edges of patterns based on the energy level comparisons wherein a high energy level difference between a central and an adjoining pixel would have a high probability of defining an edge.

In the present invention a solution to the edge blurring, when performing the smoothing operation, approaches the problem by determining edge regions and by leaving those regions undisturbed or unoperated upon and by applying a smoothing function to the smooth regions so as to reduce noise in those areas. The method has two responsibilities, number one to identify whether a pixel belongs to an edge or to a smooth region and, two, to compute a smoothing code value for the pixel if it belongs to a smooth region. Within this application, these two operations are called "segmentation" and "smoothing," respectively. Both of the aforementioned tasks are accomplished by a least squares fit of a plane to the image, in a neighborhood around the pixel of interest. If the goodness of the fit is small, then in that neighborhood the image is well approximated by a plane, and thus must be a smooth region. Further, the fit provides a smooth estimate for the code value at the pixel of interest which is the value of the fitted plane at the pixel of interest.

SUMMARY OF THE INVENTION

The preferred method of the invention functions as follows:

1. From a matrix of pixels representing an image a set of neighborhood pixel types is chosen. For example, 4 square neighborhood types are chosen: 21×21, 11×11, 5×5, 1×1.

2. For each pixel in the image (referred to as the target pixel), all neighborhoods (of all chosen neighborhood types) which contain that pixel are considered. For each target pixel there are 588 such neighborhoods (441 of size 21×21, 121 of size 11×11, 25 of size 5×5, and 1 of size 1×1).

3. For each neighborhood of the target pixel, a linear least squares regression is computed to fit a plane to the code values of the pixels in the neighborhood. The image may be considered a mathematical surface, plotting pixel code value as a function of the two pixel coordinates. The method approximates the true image surface with a planar surface, resulting in a goodness of fit (measured by $X^2$, which is a sum of squared errors normalized for the standard deviation at each pixel), and also resulting in the least squares estimate for the code value at the target pixel.

4. A "noise-reduced" code value for the target pixel is computed as a normalized, weighted sum of the least squares estimates for the target pixel, summing over all neighborhoods containing the target pixel. The weights in the sum are functions of the goodness of fit ($X^2$) and the neighborhood type (21×21, 11×11, 5×5, or 1×1).

Mathematically, this may be expressed as follows:

Let $N_{kl,\alpha}$ be a neighborhood of type $\alpha$ (such as a 5×5 square neighborhood), centered as pixel location (k,l).

Let $z_{ij}$ be the code value and $\sigma_{ij}$ be the standard deviation at pixel (i,j).

Let $X_{kl,\alpha}^2$ be the goodness of fit for the linear least squares regression of a plane on neighborhood $N_{kl,\alpha}$, and let $z_{ij}^{kl,\alpha}$ be the estimate of the regression at pixel location (i,j), where pixel (i,j) is some pixel in the neighborhood $N_{kl,\alpha}$. By definition, the least squares regression of a plane finds the coefficients a,b,c which minimize the fitting error $X_{kl,\alpha}^2$ defined by:

$$X_{kl,\alpha}^2 = \sum_{(i,j) \in N_{kl,\alpha}} \frac{[z_{ij} - (a_{kl} + b_{kl} i + c_{kl} j)]^2}{\sigma_{ij}^2} \quad (1)$$

and the estimated code value at pixel (i,j) is:

$$z_{ij}^{kl,\alpha} = a_{kl} + b_{kl} i + c_{kl} j \quad (2)$$

Compute the noise reduced code value at pixel (i,j) as:

$$z_{ij}^1 = \frac{\sum_{kl,\alpha} w(\alpha, X_{kl,\alpha}^2) z_{ij}^{kl,\alpha}}{\sum_{kl,\alpha} w(\alpha, X_{kl,\alpha}^2)} \quad (3)$$

where the sums are over all kl,α such that pixel (i,j)∈ $N_{kl,\alpha}$

Where the weighting function is:

$$w(\alpha, X_{kl,\alpha}^2) = \frac{W_\alpha}{n_\alpha} e^{-\frac{X_{kl,\alpha}^2}{v_\alpha} r_\alpha} \quad (4)$$

where $W_\alpha$ is an empirically chosen weight for each neighborhood type, $n_\alpha$ is the number of pixels in the neighborhood, $v_\alpha$ is the degrees of freedom for the least squares fit (which is the number of pixels in the neighborhood minus 3), and $r_\alpha$ is an empirically chosen rolloff parameter of order unity.

From the foregoing, it can be seen that it is a primary object of the present invention to provide an improved method for removing noise components from a digital image signal without degrading edge values.

It is a further object of the present invention to provide a smoothing of the pixel values of a digital image in smooth regions while not disturbing edge regions.

It is an additional object of the present invention to provide a method for reducing noise in the smooth regions of a digital image by a blurring technique based on least squares regression.

These and other objects of the present invention will become more apparent from the following description when taken in conjunction with the attached drawings wherein like characters indicate like parts and which drawings form a part of the present description.

DESCRIPTION OF THE PREFERRED EMBODIMENT

Figure 1:
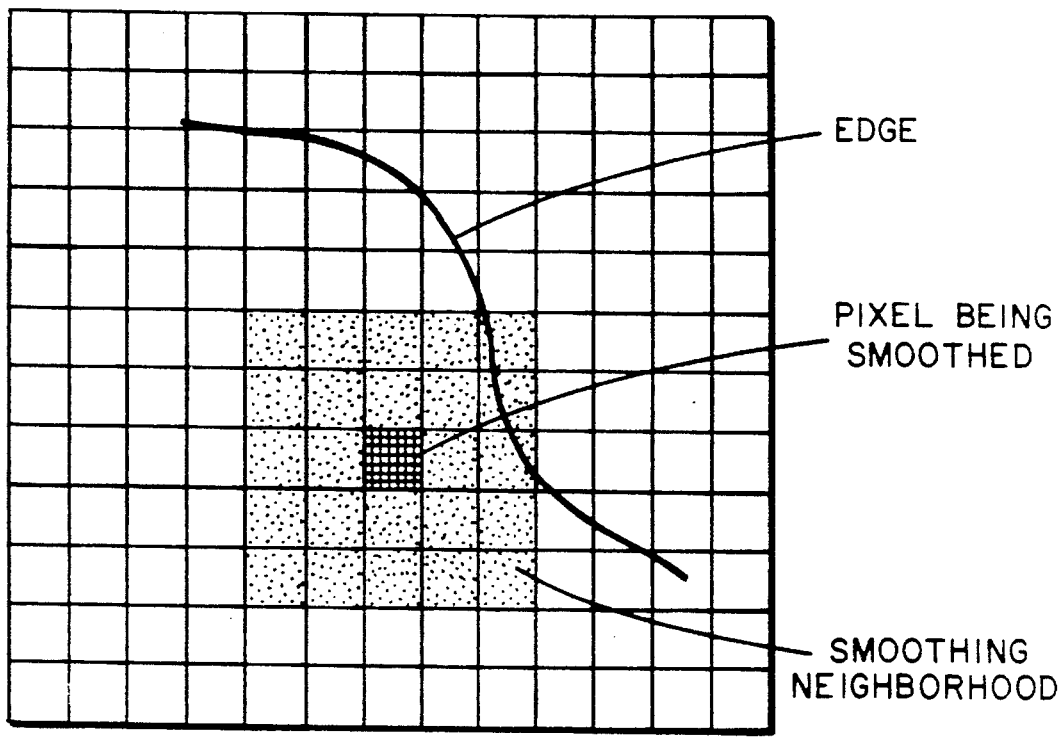
FIG. 1 is a line diagram of a pixel of interest being smoothed by a convolution technique for a pixel near an edge.

As previously mentioned, the method of the present invention has two major chores. One is to identify whether a target pixel belongs to an edge or a smooth region and the other is to compute a smoothed code value for the pixel if it belongs to the smooth region. The smoothing process can be done by convolution with a smoothing kernel, as is common practice in digital signal processing. But doing the smoothing by least squares provides an advantage. Referring to FIG. 1, wherein the smoothing of a pixel by a convolution is shown requiring the kernel "neighborhood" to be symmetric and centered on the target pixel, to provide an unbiased estimate for the smoothed target pixel. When the target pixel approaches an edge, the neighborhood surrounding the target pixel will project pixel members onto and past the edge surface. A least squares method has no such requirement.

Figure 2:
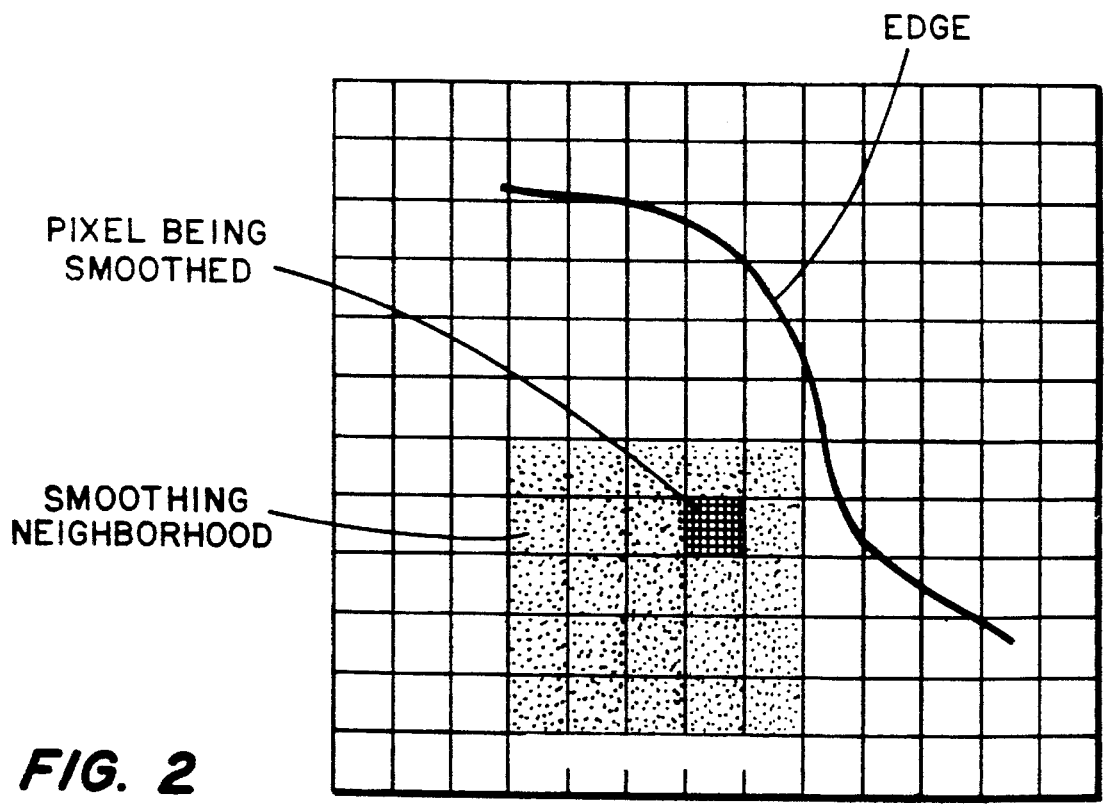
FIG. 2 is a line diagram illustrating the smoothing of a pixel of interest by a least squares technique for a pixel near an edge.

FIG. 2 illustrates the advantage of utilizing a least squares technique. The target pixel can be located with an off-center neighborhood, thereby permitting the target pixel to approach closer to an edge region. Therefore, a convolution smoothing tends to blur edges, because they "leak" into neighboring pixels. A least squares method can avoid blurring edges by choosing neighborhoods which avoid the edges.

Figure 3:
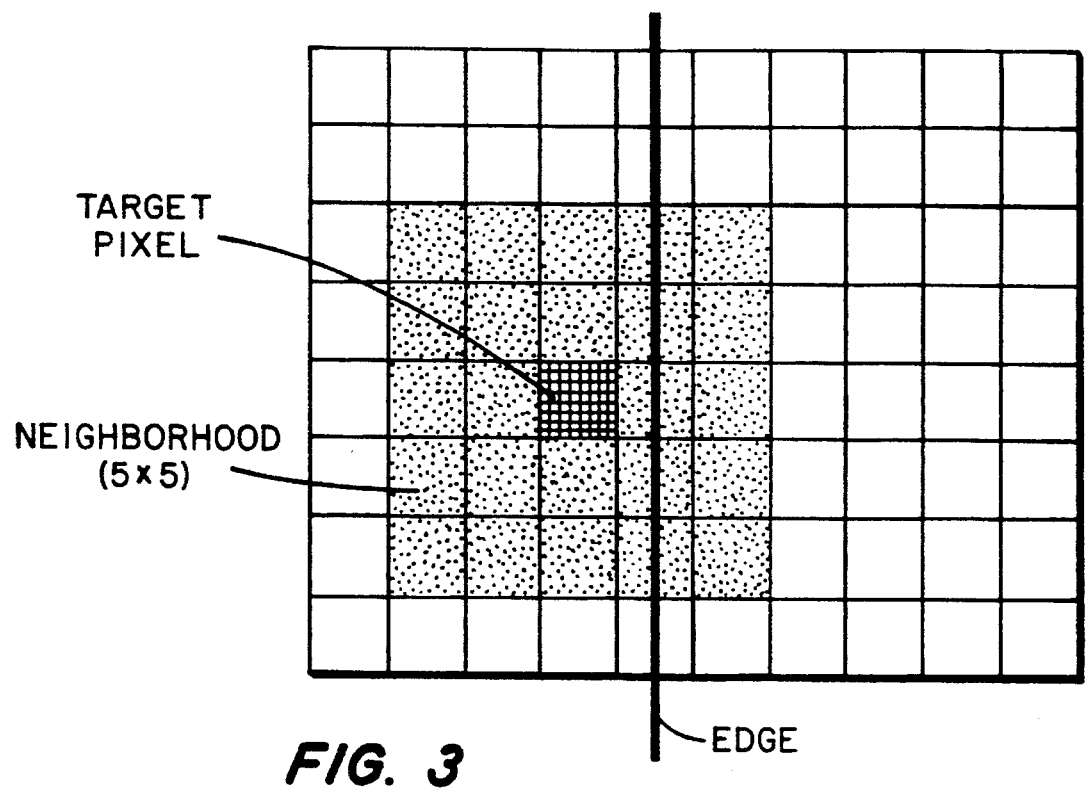
FIG. 3 illustrates a square neighborhood of pixel elements with the target pixel being near an edge.
Figure 4:
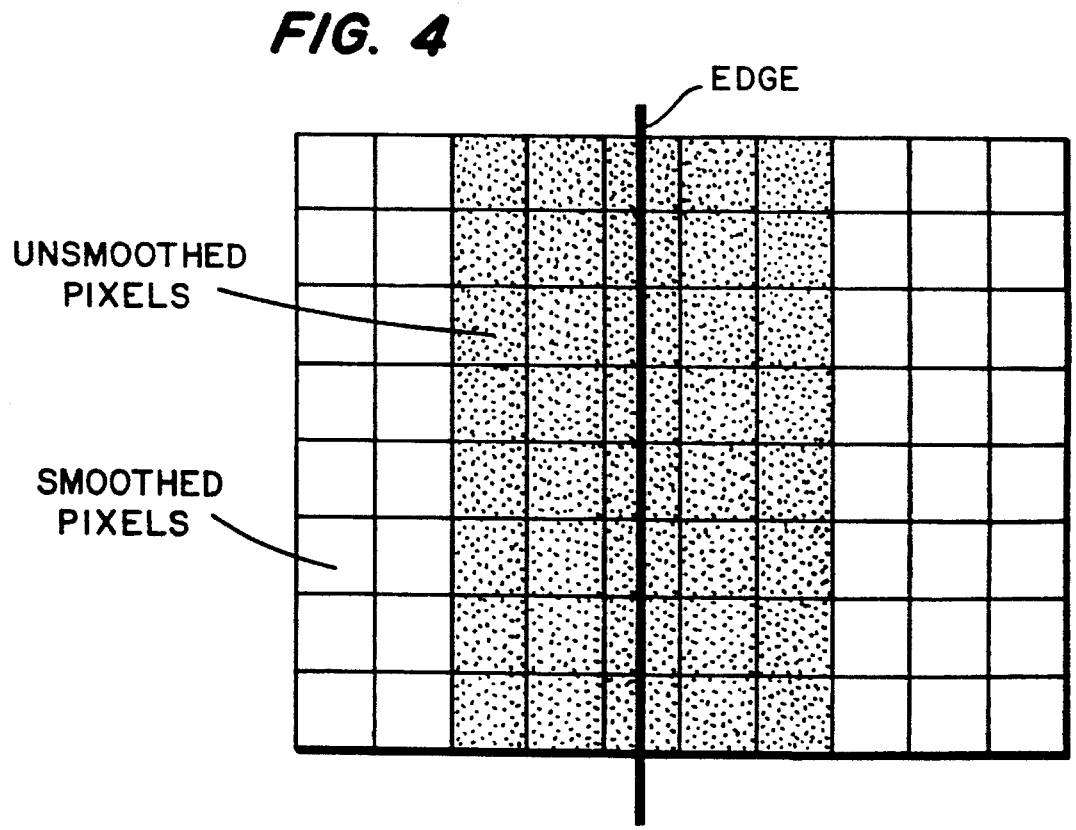
FIG. 4 illustrates the matrix of pixels with the smoothed pixels being distanced from an edge on both sides so as to create a channel of unsmoothed pixels surrounding each edge.

Referring to FIG. 3, an algorithm based on the above takes a 5×5 neighborhood centered on each target pixel and performs a least squares fit and, if the value $X^2$ ($X^2$ is a sum of squared errors normalized for the standard deviation at each pixel) is below a threshold value, the algorithm replaces the target pixel's code value by the least squares estimate. This approach is acceptable in the interior of a smooth region but fails for target pixels which are near the border of a smooth region. This failure is caused by the 5×5 neighborhood overlapping the edge or border of the smooth region, which in turn results in a large $X^2$ that exceeds the threshold value and therefore the pixel of interest is not replaced with the pixel code value or in other words is not smoothed. The result of continuing that process around an edge line is shown in FIG. 4 such that a channel or roadway of unsmoothed pixels around an edge line will result.

Figure 5:
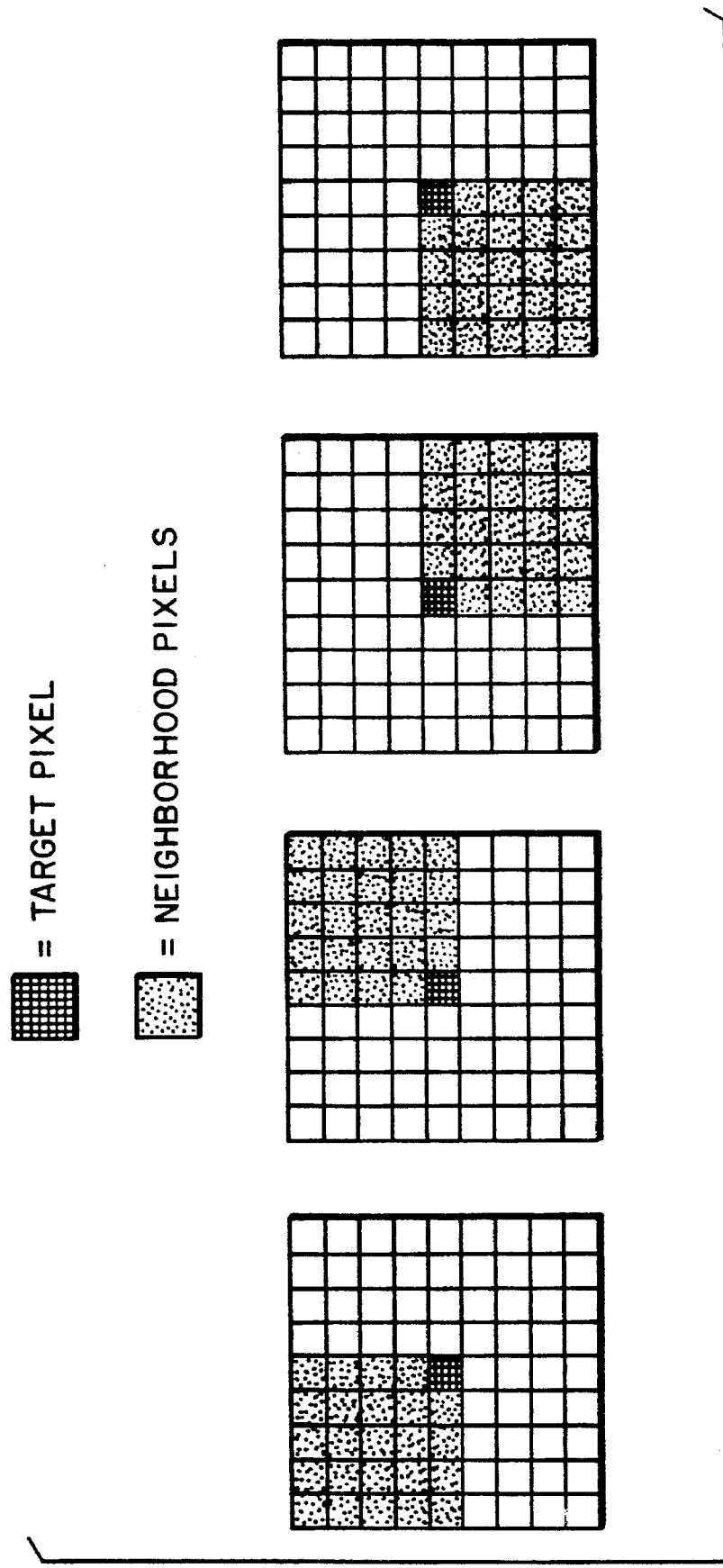
FIG. 5 illustrates four different blocks of (5×5) neighboring pixels about one target pixel (four quadrant neighborhoods).

An improvement is achieved by considering several neighborhoods for each target pixel and selecting one of the neighborhoods which results in the most preferred fit. For example, FIG. 5 illustrates a target pixel being a corner pixel for four 5×5 neighborhoods. These neighborhoods can be called quadrant neighborhoods and are used to determine the value of $X^2$ which has the smallest value. This value can then be compared against the threshold value to determine if the pixel value should be replaced with a code value. If none of the neighborhood values is below the threshold then it is assumed that the pixel is truly an edge pixel and a smoothing is not applied to it. If at least one neighborhood value is below the threshold, then the neighborhood with the lowest value is used to compute the smoothed value.

Figure 6:
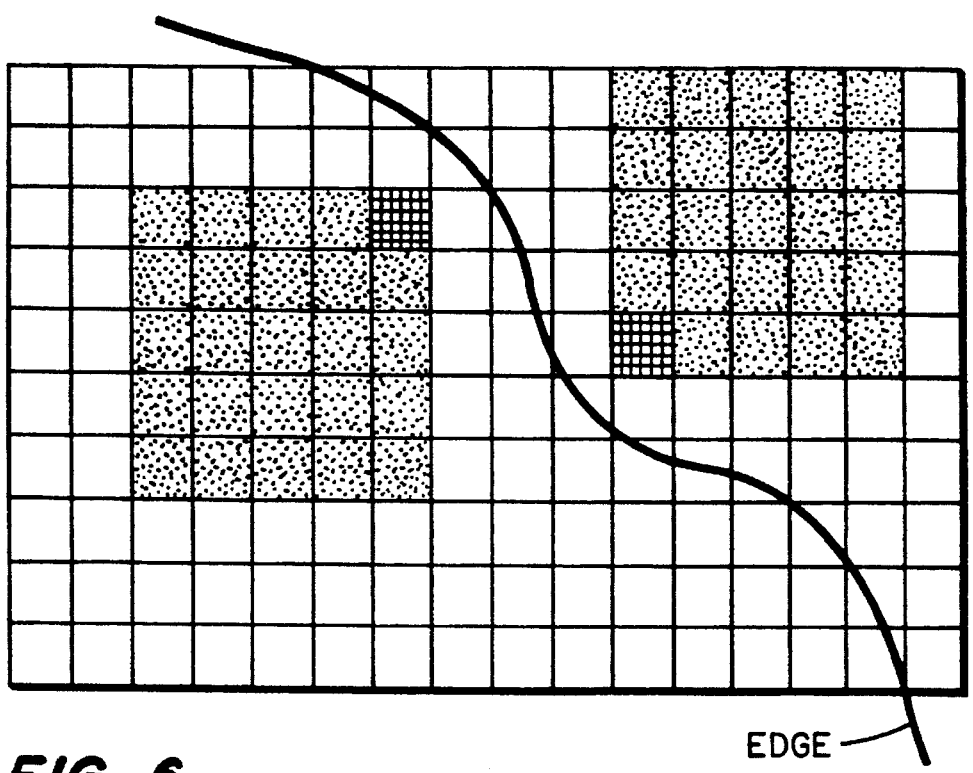
FIG. 6 illustrates a matrix of pixel elements representing selected neighborhoods for two target pixels on opposite sides of an edge.

In FIG. 6, the selected target pixel neighborhoods, for two target pixels, are shown positioned on opposite sides of an edge. The result of this is that for pixels near an edge, the pixels will be smoothed by incorporating them into neighborhoods entirely on the correct side of the edge. This method provides proper noise reduction right up to the edges (as opposed to leaving bands of noise surrounding the edges), but it also produces an artifact which makes the picture look "blocky". The artifact is caused because the algorithm has a tendency to use one type of quadrant neighborhood "such as the upper left" for several adjacent target pixels, and then to switch to another type of quadrant neighborhood (such as a lower right) for the next several target pixels, and so on.

To eliminate the "blocky" look, all of the neighborhoods containing the target pixel were used. For 5×5 neighborhoods, for each target pixel, there are 25 neighborhoods containing the target pixel. This is intended to provide a more continuous behavior, to reduce blocking, because of the larger number of neighborhoods used.

Figure 7:
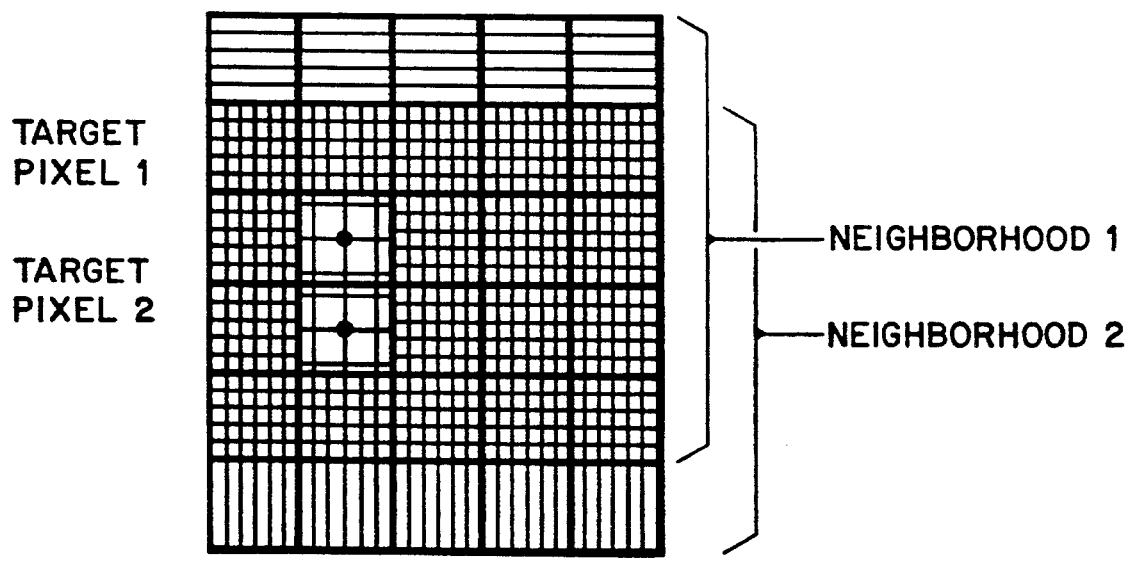
FIG. 7 represents an overlapping of corresponding neighborhoods for two adjacent target pixels.

Unfortunately, the "blocking" persists even after using all neighborhoods. This is attributed to the fact that for two adjacent target pixels, there are two sets of 25 neighborhoods (one set for each target pixel), and each neighborhood in one set contains mostly the same pixels as several neighborhoods in the other set (for example see FIG. 7). Thus the two sets of least squares fits produce similar results, and when the algorithm selects the neighborhood with the lowest $X^2$ for each target pixel, it tends to pick nearly identical neighborhoods from each of the two sets of neighborhoods. As the algorithm scans the picture selecting new target pixels, it continues to select similar neighborhoods. Occasionally the selection of neighborhood flips to a radically different choice, and then this new selection persists over may target pixels. A noticeable blocking artifact is produced where the selection flips. This is basically the same blocking artifact as described above for quadrant neighborhoods.

Since the blocking artifact appears to be caused by the instability in the selection of the single best neighborhood for each target pixel, the algorithm was modified to avoid the need to make a selection. Instead of selecting one neighborhood, the algorithm uses all neighborhoods of a target pixel, weighting them according to "goodness", applying large weight for small $X^2$ (good fits) and small weight for large $X^2$ (poor fits). This eliminates the blocking artifact.

The weighting function $w(\alpha, X^2)$ (equation 4) was originally based on the $X^2$ probability distribution, which is statistically appropriate when the model surface (a plane) correctly describes the data surface (image), with the fitting error $X^2$ resulting only from noise and errors in choosing the fitting parameters. However, analysis showed that the fitting errors $X^2$ were statistically distributed very differently from the $X^2$ distribution, even in the smooth regions. This indicates that the model surface (plane) is not an adequate description of the data surface (image). This is not surprising, since the data surface has a very curved and irregular shape, even within the smooth regions. To deal with this difficulty, the ad hoc weighting function of equation 4 was substituted for the original $X^2$ distribution based weighting function.

Neighborhood size selection is a remaining factor. The larger the neighborhood, the larger the noise reduction, because many pixels contribute to the smoothing. However, a large neighborhood size is unable to deal with details in the picture smaller than the neighborhood size. This is because for small details there is no neighborhood which fits entirely within the detail, and thus the algorithm considers the detail to be an edge region, and provides no smoothing. This difficulty is dealt with by using neighborhoods of several sizes. The algorithm weights different sized neighborhoods differently, with the result being that large smooth regions of the picture are smoothed primarily by large neighborhoods. Smaller smooth regions are smoothed primarily by smaller neighborhoods, because the large neighborhoods don't fit within the region, and thus have large $X^2$ and small weight.

Finally, it should be noted that the algorithm includes neighborhoods of size 1×1. Although this can be mathematically described simply as 1×1 neighborhoods, the intent and result are somewhat different than for larger neighborhoods—the 1×1 neighborhoods provide the mechanism by which edge regions are permitted to remain unsmoothed. In an edge region, all neighborhoods larger than 1×1 yield large $X^2$ when the least squares fit is performed. Strictly speaking, it is not possible to fit a 1×1 neighborhood with a plane, because there is only 1 data point and three fitting parameters (making the fit mathematically underdetermined). Instead, a perfect fit is assumed (i.e. the fit estimate of the code value at the single pixel is exactly equal to the original code value, and $X^2=0$). The result is that in edge regions, only the 1×1 neighborhoods have small $X^2$ and are heavily weighted, and they pass the original picture information unsmoothed.

Figure 8A:
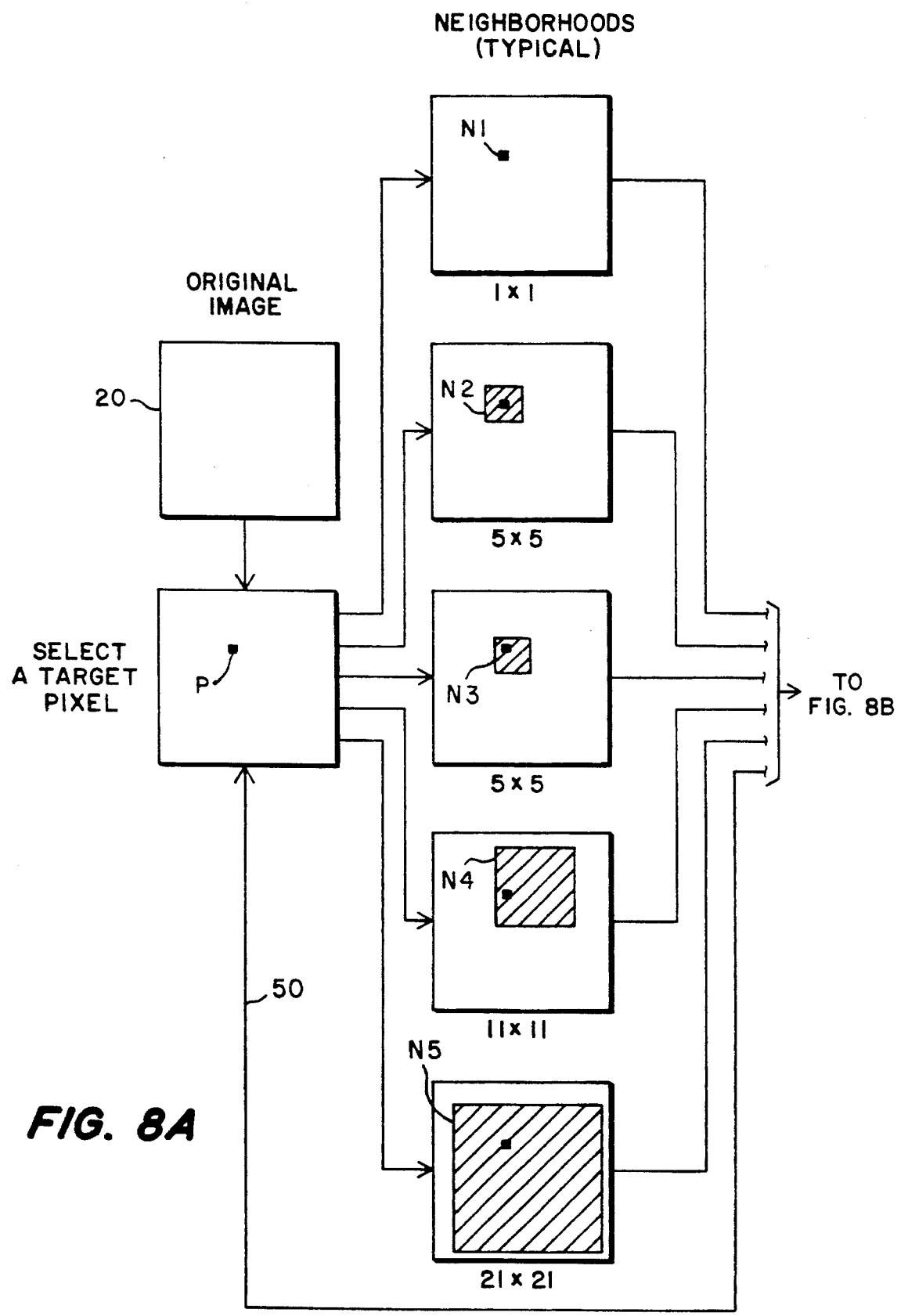
FIGS. 8A and 8B illustrate a flow chart depicting the method steps of the present invention.
Figure 8B:
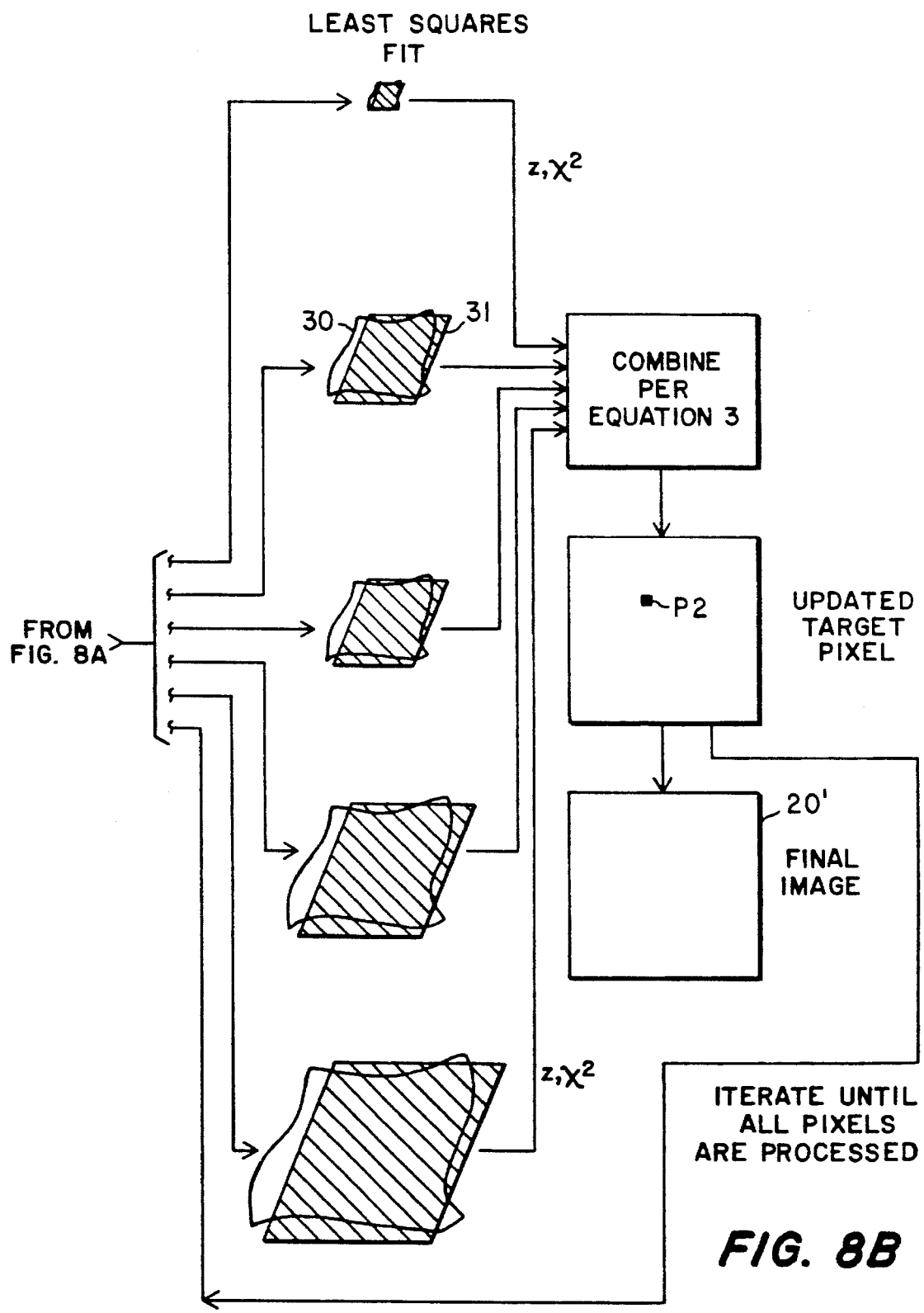
Figure 9:
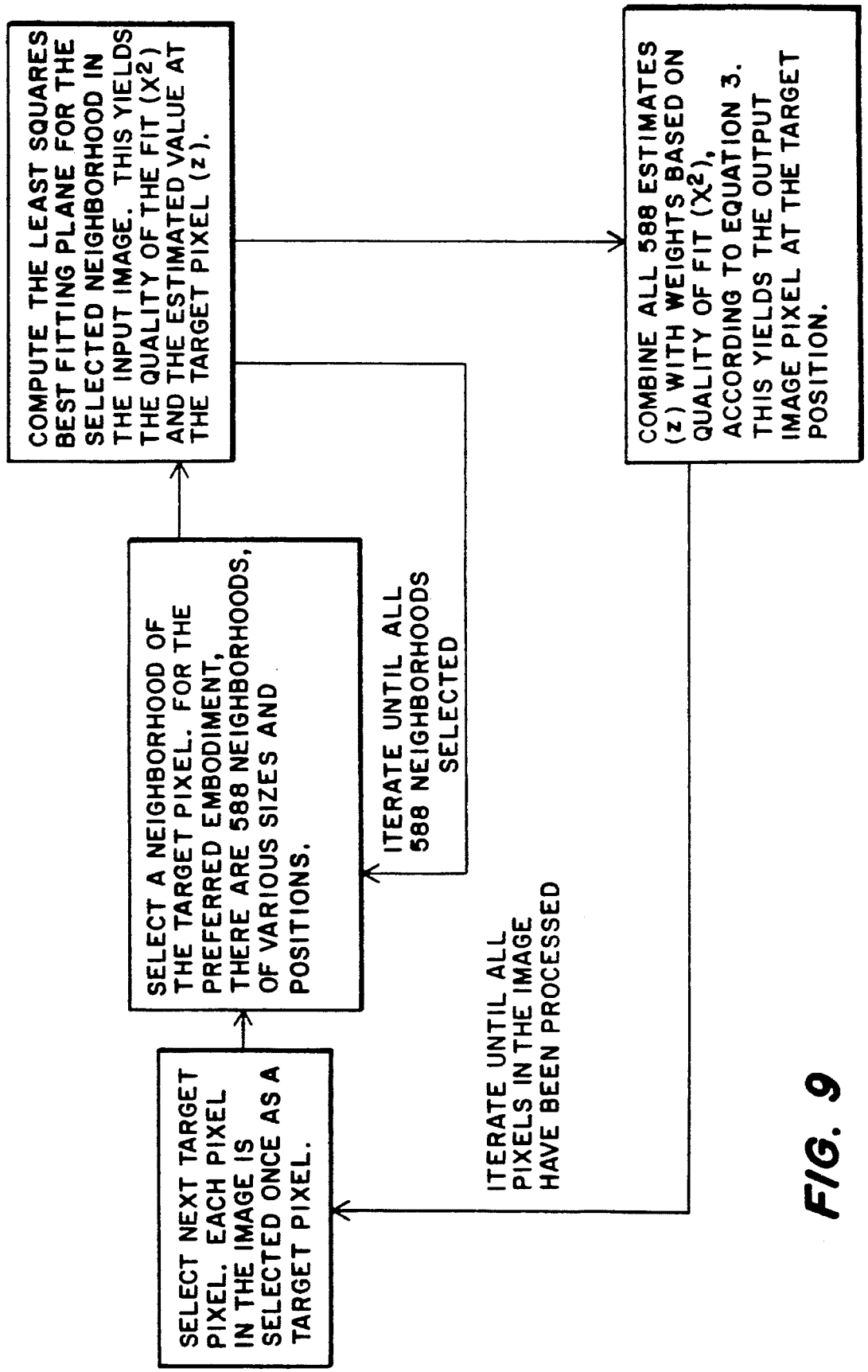
FIG. 9 illustrates in verbal flow chart form, the method steps of the flow chart of FIGS. 8A and 8B.

Referring to FIGS. 8A, 8B and 9 which illustrate in block diagram form, the flow of the present method. An original image 20, formed of a matrix of pixel elements, has one pixel P selected as the target pixel. The target pixel is then processed with neighborhood pixels, for example, N1 through N5. The result of the neighborhood analysis provides, for example, the outlines shown as area 30. A least squares fit 31 is applied to each resultant area 30. This process is continued for all 588 selected neighborhoods. The results are combined per equation 3 resulting in an updated target pixel P2 which forms one part of a final image 20'. When an updated target pixel P2 has been computed, the method is iterated per action path 50 until all of the pixels P are updated to form the full final image 20'.

While there has been shown what is considered to be the preferred embodiment of the invention, it will be manifest that many changes and modifications may be made therein without departing from the essential spirit of the invention. It is intended, therefore, in the annexed claims, to cover all such changes and modifications that may fall within the true scope of the invention.

We claim:

1. A method of operating an image processing system, in which a photographic image is digitized by a digitizing image transducer, said digitizing image transducer producing digital imagery data representative of a digital image composed of an array of image picture elements, said image processing system producing, from said digital imagery data, an output image from which noise artifacts that have been introduced into said digital image in the course of the digitization of said photographic image are reduced, so as not to be discernible to the human eye, comprising the steps of:

a. selecting a target pixel position from said array of pixels of which said digital image is comprised;

b. prescribing a neighborhood of pixels about said target pixel position;

c. for the neighborhood prescribed in step b, generating a signal representative of a goodness of fit ($X^2$) and an estimated value of the image pixel at said target pixel position in accordance with a least squares best fit plane for said prescribed neighborhood;

d. iterating steps b and c for respectively different types and respectively different positions of said prescribed neighborhood;

e. generating an output image pixel for said target pixel position in accordance with a summation of all estimated values of the image pixel at said target pixel position with weights based upon said goodness of fit ($X^2$);

f. iterating steps a through e for all pixels of said array of pixels, so as to produce output image signals associated with an output pixel array yielding a reduced noise digital image; and g. applying the output image signals produced in step f to an image reproduction device, which produces an output image in which said noise artifacts have been reduced so as not to be discernible to the human eye.

* * * * *